US010968827B2

(12) United States Patent
Alecu et al.

(10) Patent No.: US 10,968,827 B2
(45) Date of Patent: Apr. 6, 2021

(54) ANTI-ICING APPARATUS FOR A NOSE CONE OF A GAS TURBINE ENGINE

(71) Applicant: Pratt & Whitney Canada Corp., Longueuil (CA)

(72) Inventors: Daniel Alecu, Brampton (CA); Ivan Sidorovich Paradiso, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 850 days.

(21) Appl. No.: 15/278,477

(22) Filed: Sep. 28, 2016

(65) Prior Publication Data

US 2018/0087456 A1 Mar. 29, 2018

(51) Int. Cl.
*F02C 7/047* (2006.01)
*F01D 9/02* (2006.01)
(Continued)

(52) U.S. Cl.
CPC ............... *F02C 7/047* (2013.01); *F01D 9/02* (2013.01); *F02C 7/00* (2013.01); *F04D 19/002* (2013.01); *F05D 2220/32* (2013.01)

(58) Field of Classification Search
CPC ........ B64D 15/00; B64D 15/02; B64D 15/04; B64D 2033/0233; F02C 7/047;
(Continued)

(56) References Cited

U.S. PATENT DOCUMENTS

| 2,594,118 A | * | 4/1952 | Boyd | F02C 7/047 244/134 R |
| 2,630,965 A | * | 3/1953 | Greatrex | F02C 7/047 244/134 C |

(Continued)

FOREIGN PATENT DOCUMENTS

| GB | 622778 | 5/1949 | |
| GB | 634267 | 3/1950 | |
| GB | 1210202 A | * 10/1970 | ............... F02C 7/047 |

OTHER PUBLICATIONS

Norton Rose Fulbright Canada LLP, Response to Office Action dated Jan. 30, 2019 re: application No. 2,978,155.
(Continued)

*Primary Examiner* — Kenneth Bomberg
*Assistant Examiner* — Julian B Getachew
(74) *Attorney, Agent, or Firm* — Norton Rose Fulbright Canada LLP

(57) ABSTRACT

A fan nose cone is disclosed for impeding icing and recovering momentum in a gas turbine engine. The fan nose cone comprises: an axially symmetric shell having a convex external surface and an internal surface, the shell having an opening in a forward end of the shell for communication with a source of heated pressurized air; and an axially symmetric deflector disposed forward of the opening, the deflector being configured to direct heated pressurized air exiting from the opening radially outwardly to flow in a downstream direction over the convex external surface of the shell during operation. The shell of the fan nose cone may have a rearward circumferential vent in communication with the source of heated pressurized air for directing heated pressurized from the vent in a radially outward and downstream direction toward the fan blade platforms.

20 Claims, 4 Drawing Sheets

(51) Int. Cl.
*F04D 19/00* (2006.01)
*F02C 7/00* (2006.01)

(58) Field of Classification Search
CPC ........ F02C 7/00; F05D 2220/32; F01D 25/02; F01D 25/08; F01D 25/10; F04D 19/002
See application file for complete search history.

(56) References Cited

U.S. PATENT DOCUMENTS

| | | |
|---|---|---|
| 4,738,416 A | 4/1988 | Birbragher |
| 4,863,354 A | 9/1989 | Asselin et al. |
| 7,070,497 B2 * | 7/2006 | Mhatre ................ F24F 13/062 454/300 |
| 8,015,789 B2 | 9/2011 | Brand et al. |
| 8,210,825 B2 | 7/2012 | Jensen et al. |
| 2014/0199176 A1 | 7/2014 | Tomeo et al. |

OTHER PUBLICATIONS

Canadian Intellectual Property Office, Office Action dated Jul. 30, 2018 re: patent application No. 2,978,155.

* cited by examiner

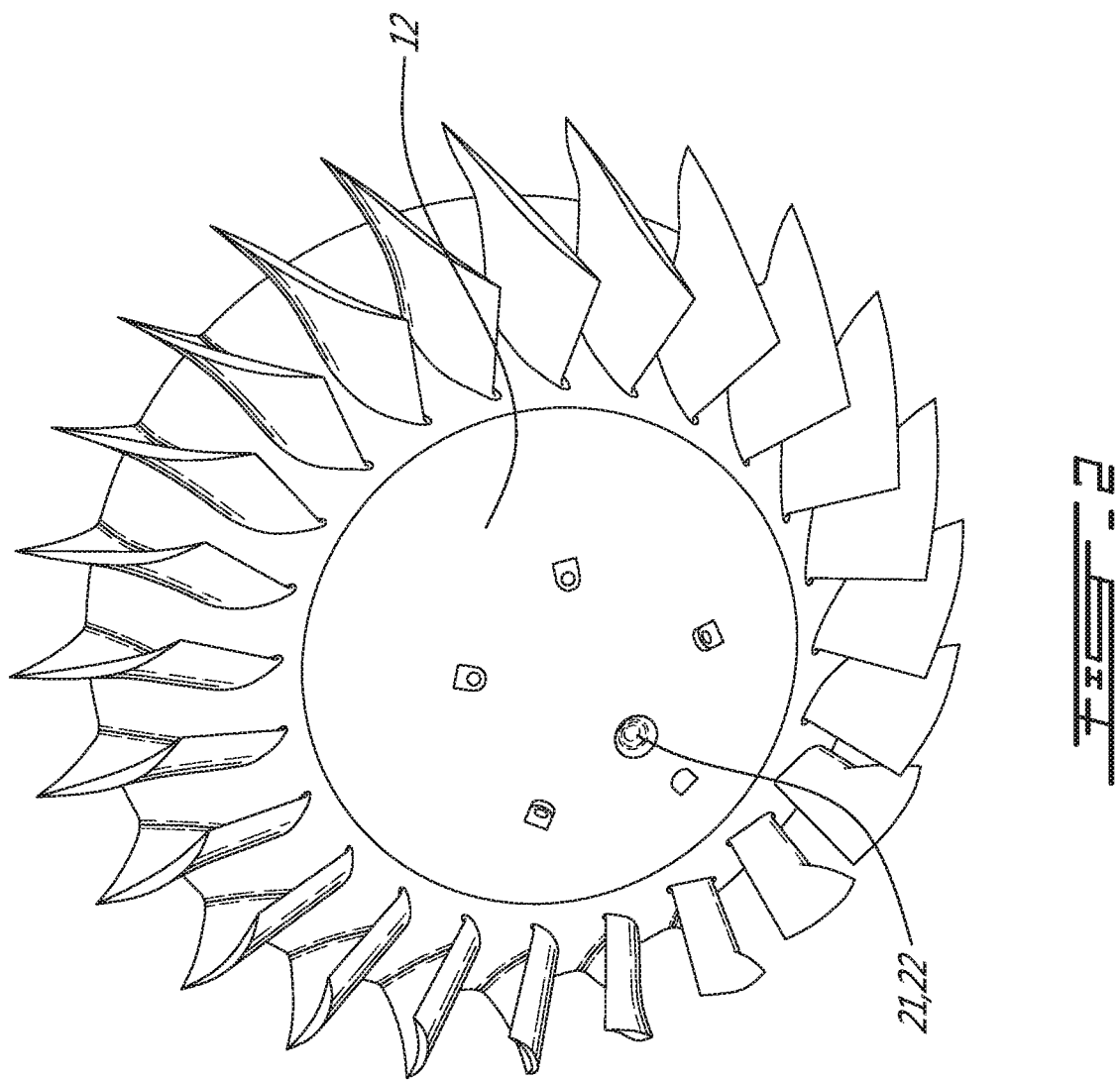

US 10,968,827 B2

ANTI-ICING APPARATUS FOR A NOSE CONE OF A GAS TURBINE ENGINE

TECHNICAL FIELD

The disclosure relates generally to aircraft engines and, more particularly, to anti-icing of a fan nose cone.

BACKGROUND OF THE ART

An ice build-up on the outer surface of a fan nose cone of a gas turbine engine can occur when an air flow containing moisture or precipitation encounters the fan nose cone under appropriate conditions. For example, ice can form when the air pressure, humidity, air flow temperature and temperature of the fan nose cone are within a specific range. Ice can accumulate in layers on the fan nose cone and then can be dislodged by air flow and motion. Hard ice particles flowing into the engine can cause foreign object impact damage to blades and ducts.

Some prior art systems to prevent ice build-up include the use of heated liquids and gases passing through channels in the fan nose cone. Examples are shown in U.S. Pat. No. 8,015,789 to Brand et al and in U.S. Pat. No. 8,210,825 to Jensen et al.

SUMMARY

In one aspect, the disclosure describes a fan nose cone for a gas turbine engine having an axis of rotation and a forward end relative to a primary airflow path through the engine. The fan nose cone comprises:

an axially symmetric shell having a convex external surface and an internal surface, the shell having an opening in a forward end of the shell, the opening adapted to be in communication with a source of heated pressurized air when the nose cone is installed on the engine; and an axially symmetric deflector disposed forward of the opening in the shell, the deflector having a rearward surface disposed forward of and cooperating with the convex external surface of the shell to define an annular air flow channel therebetween for directing heated pressurized air exiting from the opening, the rearward surface configured to radially outwardly direct said heated pressurized air to flow in a downstream direction over the convex external surface of the shell.

The opening may comprise a single central opening.

The opening may comprise a plurality of apertures symmetrically disposed about a central axis of the fan nose cone.

The deflector may have a central rearward convex protrusion that merges radially outwardly with a concave rearward surface of revolution that terminates at a circumferential edge of the deflector.

The deflector may have a convex forward surface of revolution merging at the circumferential edge.

The shell may have a rearward circumferential vent in communication with the source of heated pressurized air for directing heated pressurized air in a radially outward and downstream direction.

The vent may be disposed upstream of a plurality of fan blade platforms.

The deflector may be configured to direct the heated pressurized air at least partially rearward relative to the shell.

Embodiments may include combinations of the above features.

In another aspect, the disclosure describes a gas turbine engine having a fan mounted on a shaft for rotation about a fan axis. The fan comprises a fan hub supporting a plurality of fan blades, and a fan nose cone comprising:

an axially symmetric shell having a convex external surface and an internal surface, the shell having an opening in a forward end of the shell, the opening adapted to be in communication with a source of heated pressurized air in the engine; and an axially symmetric deflector disposed forward of the opening in the shell, the deflector having a rearward surface disposed forward of and cooperating with the convex external surface of the shell to define an annular air flow channel therebetween for directing heated pressurized air exiting from the opening, the rearward surface configured to radially outwardly direct said heated pressurized air to flow in a downstream direction over the convex external surface of the shell.

The opening may comprise a single central opening.

The opening may comprise a plurality of apertures symmetrically disposed about the fan axis.

The deflector may have a central rearward convex protrusion that merges radially outwardly with a concave rearward surface of revolution that terminates at a circumferential edge.

The deflector may have a convex forward surface of revolution merging at the circumferential edge.

The shell may have a rearward circumferential vent in communication with the source of heated pressurized air for directing heated pressurized air in a radially outward and downstream direction.

The vent may be disposed upstream of a plurality of fan blade platforms.

The deflector may be configured to direct the heated pressurized air at least partially rearward relative to the shell.

Embodiments may include combinations of the above features.

In a further aspect, the disclosure describes a method of impeding icing on a fan nose cone of a gas turbine engine where the fan nose cone comprises an axially symmetric shell having a convex external surface and an internal surface, the shell having an opening in a forward end of the shell in communication with a source of heated pressurized air in the engine, and an axially symmetric deflector disposed forward of the opening, the deflector having a rearward surface disposed forward of and cooperating with the convex external surface of the shell to define an annular air flow channel therebetween, the method comprising:

receiving heated pressurized air inside the fan nose cone and allowing the heated pressurized air to exit via the opening in the shell; and directing the heated pressurized air exiting via the opening radially outwardly to flow in a downstream direction over the convex external surface of the shell.

The shell may have a rearward circumferential vent in communication with the source of heated pressurized air, the method directing heated pressurized air from the vent in a radially outward and downstream direction.

The vent may be disposed upstream of the plurality of fan blades.

Embodiments may include combinations of the above features.

Further details of these and other aspects of the subject matter of this application will be apparent from the detailed description included below and the drawings.

DESCRIPTION OF THE DRAWINGS

Reference is now made to the accompanying drawings, in which:

FIG. 2 is a front isometric view of the fan of FIG. 1 with multiple blades with blade platforms forming a downstream air flow path and a fan nose cone in accordance with the embodiment described herein.

Further details of the invention and its advantages will be apparent from the detailed description included below.

DETAILED DESCRIPTION

Figure 1:
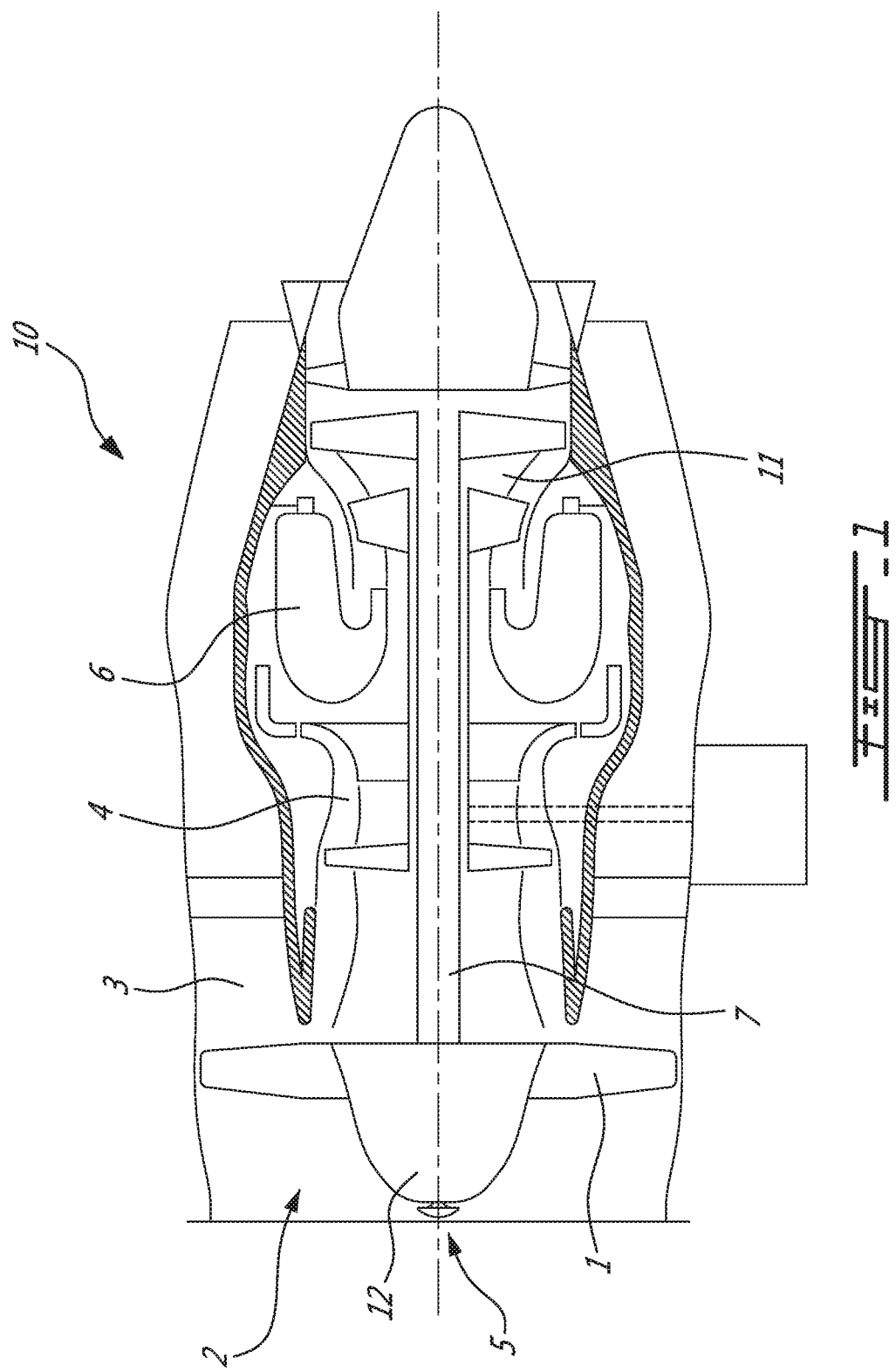
FIG. 1 is an axial cross-section view through an exemplary turbo-fan gas turbine engine having a fan with a fan nose cone with air flow from left to right as drawn.

FIG. 1 illustrates a gas turbine engine 10 of a type preferably provided for use in subsonic flight, generally comprising in serial flow communication a fan 2 through which ambient air is propelled, a multistage compressor 4 for pressurizing the air, a combustor 6 in which the compressed air is mixed with fuel and ignited for generating an annular stream of hot combustion gases, and a turbine section 11 for extracting energy from the combustion gases. Air received into a forward end of engine 10 relative to a primary airflow path passes axially over the fan nose cone 12 and the fan blades 1 of the fan 2. The air received is then split into an outer annular flow through the bypass duct 3 and an inner/core flow through compressor 4.

Engine 10 may be of the type suitable for aircraft applications. It will be understood that aspects of the disclosure may be equally applicable to any type of engine with a fan nose cone and a source of relatively hot air (e.g., from compressor 4). Engine 10 may comprise apparatus 5 useful in providing anti-icing to fan nose cone 12.

Figure 4:
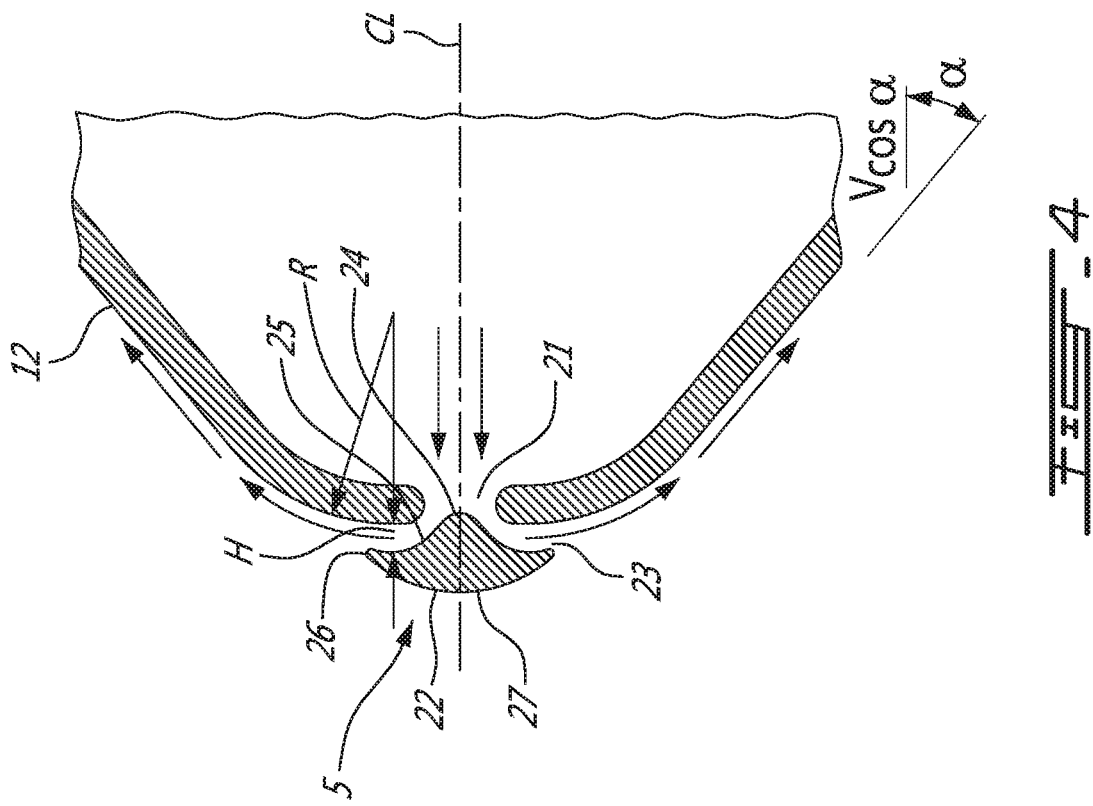
FIG. 4 is an axial sectional view through the front tip of the fan nose cone of FIG. 3.
Figure 3:
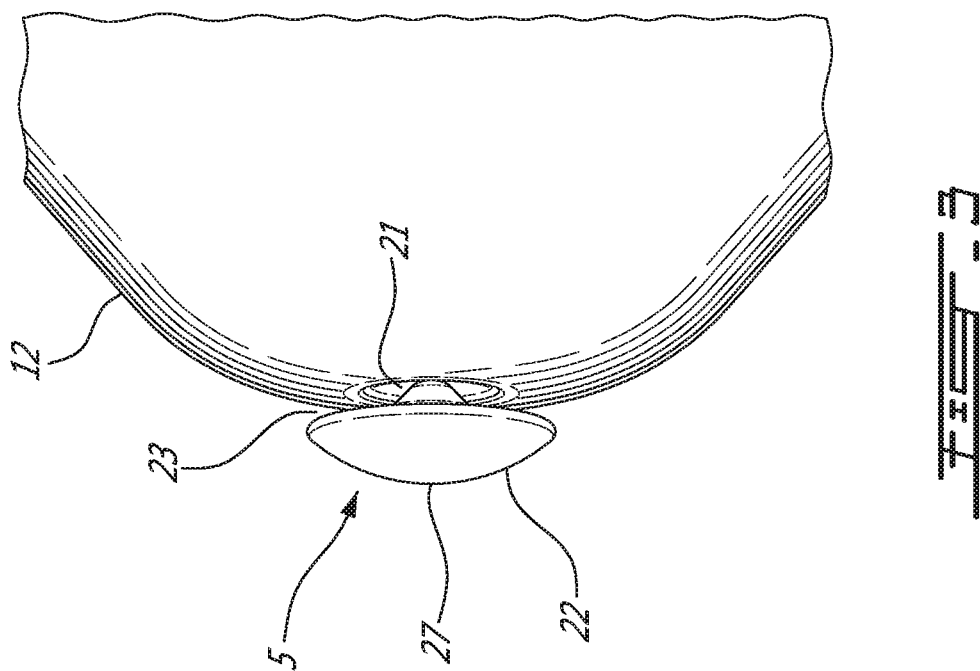
FIG. 3 is a detail front-left view of the front tip of the fan nose cone showing a deflector for directing heated pressurized air from a central opening to form a heated pressurized air curtain over the convex external surface of the shell flowing in a radially outward and downstream direction.

FIGS. 2-4 illustrate apparatus 5 for providing anti-icing to fan nose cone 12. In some embodiments, apparatus 5 may comprise deflector 22 configured to direct heated pressurized air exiting from the opening 21 radially outwardly to flow as an air curtain over the convex external surface of the shell in a downstream direction during operation. Deflector 22 may also be configured to direct the heated air partially rearwardly (i.e., toward the downstream direction) during operation. In some embodiments, deflector 22 may be in the form of a plug disposed upstream of and partially occluding the opening 21. Pressurized heated air for anti-icing purposes may originate from compressor 4 for example or any other suitable location within engine 10. In some embodiments, such pressurized heated air may be routed from compressor 4 to the interior of fan nose cone 12 via one or more bearing housing chambers to provide cooling to such bearings before getting to fan nose cone 12. In some embodiments, such pressurized heated air may be routed from compressor 4 to the interior of fan nose cone 12 via a hollow center of low pressure shaft 7 to which fan 2 may be drivingly coupled.

The flow of air exiting (i.e., being discharged from) opening 21 and being directed by deflector 22 may form a heated air curtain or boundary layer flow that attaches to the exterior surface of fan nose cone 12. For example, in some embodiments, the exterior convex curvature of fan nose cone 12 and shape of deflector 22 facing opening 21, through which heated air is ejected, may combine to produce a Coanda effect or laminar air flow that maintains contact with the convex exterior surface of fan nose cone 12 to improve the anti-icing effectiveness provided by the heated air flow. Such Coanda effect may be a tendency of a jet of fluid emerging from an orifice to follow an adjacent curved surface and may entrain fluid from the surroundings so that a region of lower pressure may develop.

In some embodiments, fan nose cone 12 may comprise a substantially axially symmetric hollow shell having an external surface exposed to a free stream of air entering engine 10. In some embodiments, at least part of the external surface of fan nose cone 12 may be convex. The interior (i.e., internal surface) of fan nose cone 12 and hence opening 21 may be communication with the source of heated pressurized air in any suitable manner such as being conveyed to the interior of fan nose cone 12 via the hollow low pressure shaft 7 shown in FIG. 1. The shell of fan nose cone 12 may have opening 21 disposed in a forward end thereof through which the heated pressurized air within the fan nose cone 12 may be discharged as indicated by arrows in FIG. 4. Even though opening 21 is shown as a single central opening in FIGS. 3 and 4, it is understood that, alternatively, opening 21 could comprise a plurality of apertures. For example, such apertures could be symmetrically distributed about a central axis CL of fan 2, which may, in some embodiments, correspond to a central axis of engine 10, to create the required heated air curtain or boundary layer over the outer surface of fan nose cone 12.

Deflector 22 may be configured as an axially symmetric plug that is disposed forward (i.e., upstream) of the opening 21 and can be supported in place by radial ribs, a central post or other structures (not shown) of suitable external aerodynamic shape. The deflector 22 may have a rearward surface 25 disposed forward and spaced apart from the convex external surface of the shell to thereby define an annular air flow channel 23 or slot. In various embodiments, rearward surface 25 of deflector 22 may cooperate with the convex external surface of fan nose cone 12 to form a circumferentially-continuous annular flow channel 23. Alternatively, such flow channel 23 may be non-continuous (interrupted) due to radial ribs to form a plurality of apertures. The axial position of the deflector 22 could also be adjustable relative to fan nose cone 12 to change or regulate the flow of heated air. The deflector 22 may have a central rearward convex protrusion 24 that merges radially outwardly with a concave rearward surface of revolution 25 that terminates at a circumferential edge 26. In the illustrated example, the concave rearward surface of revolution 25 has a partial toroid surface although other shapes suitable to direct the air flow in a suitable manner are possible.

The geometric relationship between the size of the opening 21, curvature of the exterior surface of fan nose cone 12, curvature of the concave rearward surface of revolution 25, and size of the annular air flow channel 23 together with heated air pressure and engine operating parameters may be selected to create a Coanda effect and produce an attached air curtain or boundary layer of heated air flowing downstream along the exterior surface of the fan nose cone 12. For example, in some embodiments, the height H of the annular gap provided by flow channel 23 and the radius of curvature R of the exterior surface of fan nose cone 12 adjacent flow channel 23 may be related and selected to provide the Coanda effect. For example, in some embodiments, a ratio between radius R and height H (i.e., R/H) as illustrated in FIG. 4 may be selected based on a Reynolds number of the flow through flow channel 23. For example, in some embodiments, the ratio R/H may be inversely related (e.g., proportional) to the Reynolds number so that a higher ratio of R/H may be suitable for a smaller Reynolds number. The ratio of R/H and actual values of R and H may be selected based on testing (i.e., empirically) or based on numerical analysis and may depend on the specific installation and operating conditions. In some embodiments, the curvature of a portion of the external surface of fan nose cone 12 adjacent flow channel 23 may have a generally constant radius of curvature R so that the external surface may have a generally arcuate cross-sectional profile in that particular portion. In some embodiments, the portion of the external surface may be outwardly curved according to a suitable polynomial function. In some embodiments, different portions of the external surface of fan nose cone 12 may have different curvatures.

The deflector 22 may have an exterior convex forward surface of revolution 27 to direct incoming air flow. In some embodiments, the exterior convex forward surface of revolution 27 may merge at the circumferential edge 26 without a sharp edge. The concave rearward surface of revolution 25 of deflector 22 together with incoming air flowing over the exterior convex forward surface of revolution 27 may direct heated pressurized air being discharged from the opening 21 to flow in a manner forming a heated pressurized air curtain over at least part of the exterior surface of the fan nose cone 12 in a radially outward and downstream direction as indicated by arrows in FIG. 4.

In some embodiments, the substantial attachment of the heated air boundary layer may extend an area of the fan nose cone 12 that can be maintained above water freezing temperature at the lower pressures encountered during flight and may improve anti-icing capability. The longer that a heated air curtain is in contact or maintained adjacent the outer surface of the fan nose cone 12, the longer that area of the fan nose cone 12 may be protected from icing.

In addition to anti-icing benefits, the above described deflector 22 and fan nose cone 12 arrangement may, in some embodiments, improve engine efficiency due to axial momentum recovery. For example, as opposed to discharging the flow of heated air from the opening 21 directly in the upstream direction and in direct opposition to the incoming air flow entering the fan 2 and engine 10, the use of deflector 22 causes the heated air to be directed in a more favorable direction. The heated flow of air requires engine power to create the necessary air pressure, upstream velocity and temperature. The loss of axial momentum $l_0$ for a situation where the heated air would be discharged directly in the upstream direction can be represented by the formula $l_0$=mass×axial velocity vector=−m·v. Since the axial velocity vector is negative (i.e., in an upstream direction), the axial momentum $l_0$ is also negative and would represent a loss in momentum in such exemplary situation.

In contrast, referring to FIG. 4, the diverted or redirected flow of heated pressurized air shown by arrows is in a radially outward and downstream direction. The velocity vector has a radially outward components which are equal, in opposite directions and are balanced and therefore having no effect on axial momentum. On the other hand, the axial component of the velocity vector is directed downstream and hence is positive and is in a favorable direction. Assuming that the mass of heated air flow (m) and velocity (v) when discharged are identical to above example, the gain of axial momentum $l_1$ can be represented by the formula $l_1$=mass×axial velocity vector. Since the velocity vector is positive (i.e., downstream direction), the axial momentum $l_1$ is also positive and represents a gain, which results in a net gain in momentum $\Delta l$ as follows:

$$l_1 = \text{mass} \times \text{axial velocity vector} = m \times \text{air velocity}(v) \times \cosine \alpha.$$

where $\alpha$ is the angle of the velocity vector relative to the engine axis which may correspond to the central axis of fan 2 in some embodiments.

Accordingly the net gain in momentum $\Delta l$ can be calculated as follows:

$$\Delta l = l_0 - l_0 = m \cdot v \cdot \cos \alpha - (-m \cdot v) = m \cdot v (\cos \alpha + 1).$$

Therefore in some embodiments, the penalty in a loss of momentum $l_0$ may be avoided and the axial downstream flow of air may add to forward momentum $l_1$ resulting in a net change or gain of momentum $\Delta l = m \sim v (\cos \alpha + 1)$.

Figure 5:
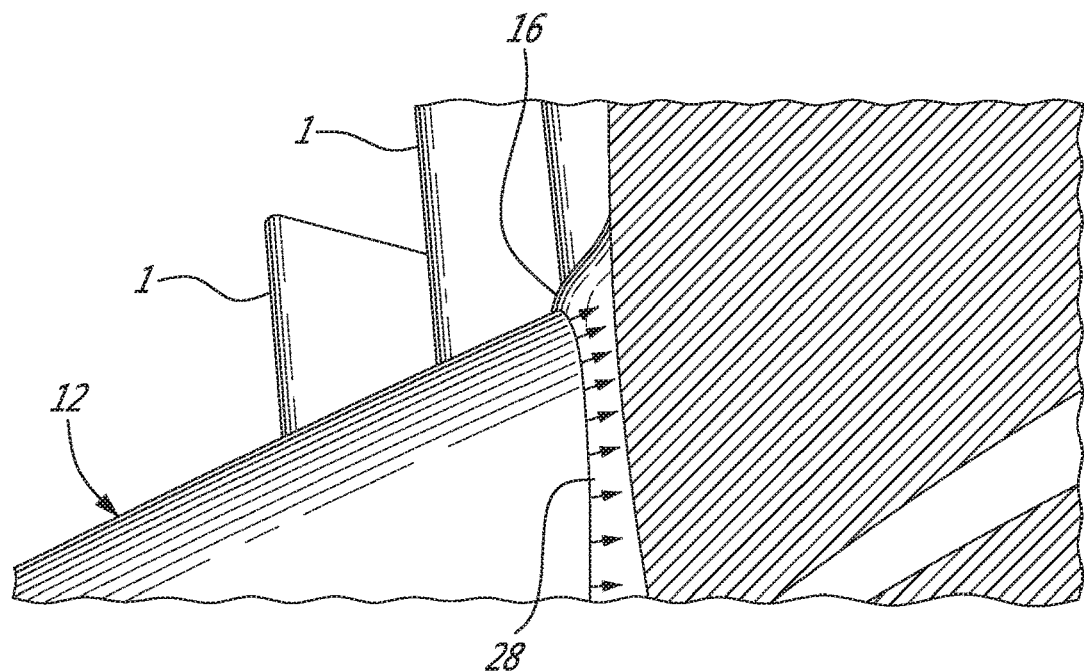
FIG. 5 is a detail front-left view of a circumferential vent located at the downstream edge of the fan nose cone in communication with the source of heated pressurized air for directing a heated pressurized air curtain from the vent in a radially outward and downstream direction toward the fan blade platforms.
Figure 6:
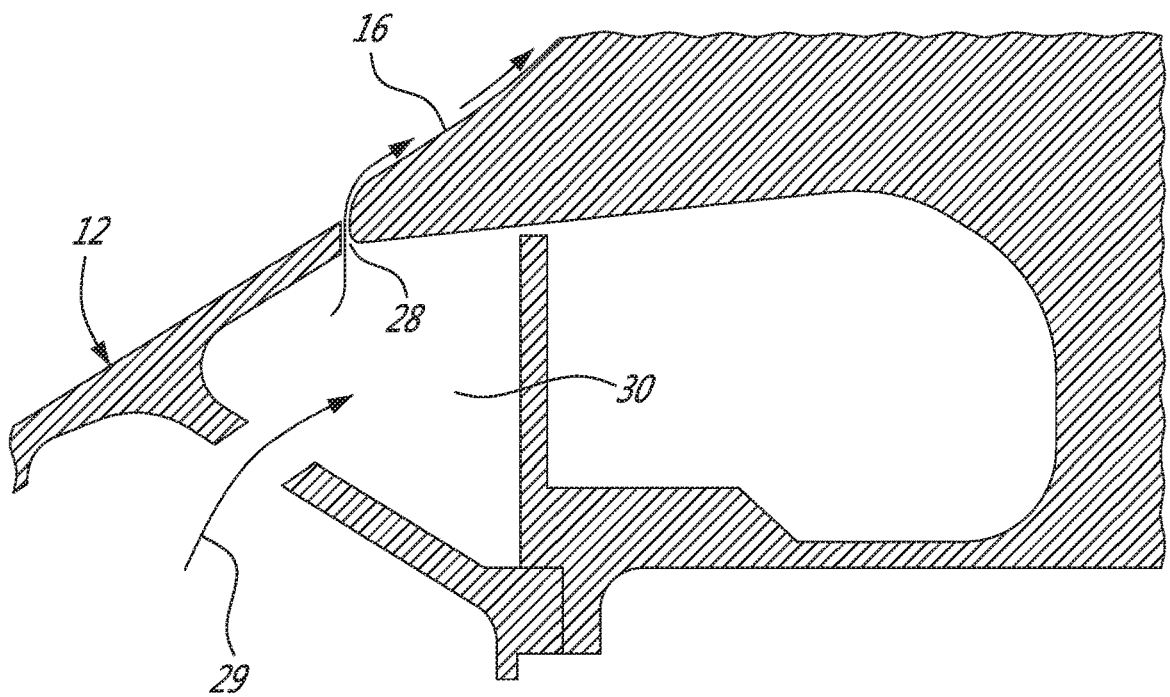
FIG. 6 is an axial sectional view through the downstream edge of the fan nose cone of FIG. 5.

FIGS. 5 and 6 illustrate an optional circumferential vent 28 located at a downstream edge of the fan nose cone 12 that is configured to discharge heated pressurized air to form a heated pressurized air curtain or boundary layer flow from the vent 28 in a radially outward and downstream direction to improve anti-icing of the fan blade platforms 16 downstream from the circumferential vent 28.

In some embodiments, the exterior of the fan nose cone 12 and fan blade platforms 16 downstream from the tip of the fan nose cone 12 may, in some conditions, may be prone to icing formation if the air temperature is sufficiently low. In order to provide an additional heated air flow in these areas, the fan nose cone 12 may include an optional rearward circumferential vent 28 in communication with the source of heated pressurized air from the engine 10. FIG. 6 shows with arrow 29 a flow of heated air moving from within the interior of the fan nose cone 12 to an annular plenum 30. The presence of heated air in contact with the interior surface of the fan nose cone 12 may raise the temperature of the fan nose cone 12 and raise the temperature of the exterior surface the fan nose cone 12 as well. The pressurized heated air may then be discharged from the vent 28 to form a heated pressurized air curtain in a radially outward and downstream direction immediately upstream from the fan blade platforms 16 (e.g., upstream from blades 1).

In the example shown in FIGS. 5 and 6, the circumferential vent 28 is disposed immediately upstream from fan blade platforms 16. Additional intermediary vents (not shown) having a continuous circumferential opening like vent 28 could also be disposed anywhere along the length of the fan nose cone 12. Intermediary vents would provide a heated curtain of air between the tip of the fan nose cone 12 and the vent 28 to de-ice the intermediate areas of the fan nose cone 12.

Although the above description relates to a specific preferred embodiment as presently contemplated by the inventors, it will be understood that the invention in its broad aspect includes mechanical and functional equivalents of the elements described herein.

We claim:

1. A fan nose cone for a gas turbine engine having an axis of rotation and a forward end relative to a primary airflow path through the engine, the fan nose cone comprising:
   an axially symmetric shell having a convex external surface and an internal surface, the shell having an opening in a forward end of the shell, the opening adapted to be in communication with a source of heated pressurized air when the nose cone is installed on the engine; and an axially symmetric deflector disposed forward of the opening in the shell, the deflector having a rearward surface disposed forward of and cooperating with the convex external surface of the shell to define an annular air flow channel therebetween for directing heated pressurized air exiting from the opening, the rearward surface configured to radially outwardly direct said heated pressurized air to flow in a downstream direction over the convex external surface of the shell, the deflector having a central protrusion that is rearwardly convex and that merges radially outwardly with a concave rearward surface of revolution that terminates at a circumferential edge of the deflector.

2. The fan nose cone according to claim 1 wherein the opening comprises a single central opening.

3. The fan nose cone according to claim 1 wherein the deflector has a convex forward surface of revolution that extends to the circumferential edge.

4. The fan nose cone according to claim 1 wherein the shell has a rearward circumferential vent in communication with the source of heated pressurized air for directing heated pressurized air in a radially outward and downstream direction.

5. The fan nose cone according to claim 4 wherein the vent is disposed upstream of a plurality of fan blade platforms.

6. The fan nose cone according to claim 1 wherein the deflector is configured to direct the heated pressurized air at least partially rearward relative to the shell.

7. The fan nose cone according to claim 1, wherein the central protrusion of the deflector extends into the opening of the shell.

8. The fan nose cone according to claim 1, wherein a rearward extremity of the central protrusion is rounded.

9. The fan nose cone according to claim 1, wherein a portion of the convex external surface of the shell extending axially from within the annular air flow channel to downstream of the annular air flow channel has a constant radius of curvature.

10. The fan nose cone according to claim 1, wherein:
the central protrusion of the deflector extends into the opening of the shell;
a rearward extremity of the central protrusion is rounded; and
a portion of the convex external surface of the shell extending axially from within the annular air flow channel to downstream of the annular air flow channel has a constant radius of curvature.

11. A gas turbine engine having a fan mounted on a shaft for rotation about a fan axis, the fan comprising a fan hub supporting a plurality of fan blades, and a fan nose cone comprising:
an axially symmetric shell having a convex external surface and an internal surface, the shell having an opening in a forward end of the shell, the opening adapted to be in communication with a source of heated pressurized air in the engine; and an axially symmetric deflector disposed forward of the opening in the shell, the deflector having a rearward surface disposed forward of and cooperating with the convex external surface of the shell to define an annular air flow channel therebetween for directing heated pressurized air exiting from the opening, the rearward surface configured to radially outwardly direct said heated pressurized air to flow in a downstream direction over the convex external surface of the shell, the deflector having a central protrusion that is rearwardly convex and that merges radially outwardly with a concave rearward surface of revolution that terminates at a circumferential edge of the deflector.

12. The gas turbine engine according to claim 11 wherein the opening comprises a single central opening.

13. The gas turbine engine according to claim 11 wherein the deflector has a convex forward surface of revolution that extends to the circumferential edge.

14. The gas turbine engine according to claim 11 wherein the shell has a rearward circumferential vent in communication with the source of heated pressurized air for directing heated pressurized air in a radially outward and downstream direction.

15. The gas turbine engine according to claim 14 wherein the vent is disposed upstream of a plurality of fan blade platforms.

16. The gas turbine engine according to claim 11 wherein the deflector is configured to direct the heated pressurized air at least partially rearward relative to the shell.

17. The gas turbine engine according to claim 11, wherein the fan nose cone is mounted for rotation with the shaft.

18. A method of impeding icing on a fan nose cone of a gas turbine engine where the fan nose cone comprises an axially symmetric shell having a convex external surface and an internal surface, the shell having an opening in a forward end of the shell in communication with a source of heated pressurized air in the engine, and an axially symmetric deflector disposed forward of the opening, the deflector having a rearward surface disposed forward of and cooperating with the convex external surface of the shell to define an annular air flow channel therebetween, the deflector having a central protrusion that is rearwardly convex and that merges radially outwardly with a concave rearward surface of revolution that terminates at a circumferential edge of the deflector, the method comprising:
receiving heated pressurized air inside the fan nose cone and allowing the heated pressurized air to exit via the opening in the shell; and
using the central protrusion and the concave rearward surface of revolution to direct the heated pressurized air exiting via the opening radially outwardly to flow in a downstream direction over the convex external surface of the shell.

19. The method according to claim 18, wherein the shell has a rearward circumferential vent in communication with the source of heated pressurized air, the method comprising:
directing heated pressurized air from the vent in a radially outward and downstream direction.

20. The method according to claim 19 wherein the vent is disposed upstream of a plurality of fan blades.

* * * * *